(12) United States Patent
Gupta et al.

(10) Patent No.: US 11,646,956 B2
(45) Date of Patent: May 9, 2023

(54) SYSTEMS AND METHODS FOR PROVIDING BIDIRECTIONAL FORWARDING DETECTION WITH PERFORMANCE ROUTING MEASUREMENTS

(71) Applicant: Cisco Technology, Inc., San Jose, CA (US)

(72) Inventors: Anubhav Gupta, Fremont, CA (US); Mahesh Eknath Bhole, San Jose, CA (US); Laxmikantha Reddy Ponnuru, Santa Clara, CA (US); Ajay Kumar Mishra, Livermore, CA (US); Prabahar Radhakrishnan, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/675,465

(22) Filed: Nov. 6, 2019

(65) Prior Publication Data
US 2021/0029008 A1 Jan. 28, 2021

Related U.S. Application Data

(60) Provisional application No. 62/877,997, filed on Jul. 24, 2019.

(51) Int. Cl.
*G06F 15/173* (2006.01)
*H04L 43/0829* (2022.01)
(Continued)

(52) U.S. Cl.
CPC ...... *H04L 43/0829* (2013.01); *H04L 41/0627* (2013.01); *H04L 43/087* (2013.01);
(Continued)

(58) Field of Classification Search
CPC ............ H04L 43/0864; H04L 43/0829; H04L 45/123; H04L 45/22; H04L 45/42;
(Continued)

(56) References Cited

U.S. PATENT DOCUMENTS 8,139,479 B1 * 3/2012 Raszuk ............... H04L 43/0811
370/228
8,665,699 B2 3/2014 Bellagamba et al.
(Continued)

FOREIGN PATENT DOCUMENTS

KR 2016-01351532 11/2016
WO 2012088843 7/2012

OTHER PUBLICATIONS

International Search Report and Written Opinion from the International Searching Authority, dated Oct. 16, 2020, 14 pages, for corresponding International Patent Application No. PCT/US2020/042155.
(Continued)

*Primary Examiner* — Anh Nguyen
*Assistant Examiner* — Tesfu N Mekonen
(74) *Attorney, Agent, or Firm* — Polsinelli

(57) ABSTRACT

Disclosed is a first device and a second device each sending BFD echo request packets in an initial stage of establishing communication between the two devices. A method can include determining that a certain mode is detected, such as a low bandwidth mode. The method can be practiced by one or both of the devices or a separate network controller. Based on the detection of the certain mode or the communication link being in a certain mode, the method includes the first device or the second device electing to be a master or a slave. Upon establishing that one of the devices is the master and the other of the devices is a slave, only the master will send BFD echo request packets.

20 Claims, 10 Drawing Sheets

(51) Int. Cl.
*H04L 43/0811* (2022.01)
*H04L 43/0817* (2022.01)
*H04L 41/0604* (2022.01)
*H04L 45/42* (2022.01)
*H04L 45/00* (2022.01)
*H04L 43/087* (2022.01)

(52) U.S. Cl.
CPC ...... *H04L 43/0811* (2013.01); *H04L 43/0817* (2013.01); *H04L 45/22* (2013.01); *H04L 45/42* (2013.01)

(58) Field of Classification Search
CPC ............... H04L 43/087; H04L 41/0627; H04L 43/0817; H04L 43/0811
USPC .......................................................... 709/224
See application file for complete search history.

(56) References Cited

U.S. PATENT DOCUMENTS

| | | | | |
|---|---|---|---|---|
| 9,258,234 | B1* | 2/2016 | Addepalli | H04L 67/142 |
| 9,300,563 | B2 | 3/2016 | Rahman et al. | |
| 10,003,552 | B2* | 6/2018 | Kumar | H04L 45/586 |
| 2009/0046723 | A1* | 2/2009 | Rahman | H04L 41/0695 370/395.31 |
| 2010/0149992 | A1* | 6/2010 | Tan | H04L 45/02 370/242 |
| 2011/0199929 | A1* | 8/2011 | Guo | H04L 43/0829 370/252 |
| 2016/0036694 | A1* | 2/2016 | Abdul | H04L 43/10 370/244 |
| 2016/0197853 | A1* | 7/2016 | Kumar | H04L 43/10 370/389 |
| 2017/0005915 | A1* | 1/2017 | Mirsky | H04L 69/40 |
| 2017/0201435 | A1* | 7/2017 | Tan | H04L 43/08 |
| 2018/0062940 | A1 | 3/2018 | Pignataro et al. | |
| 2018/0351784 | A1* | 12/2018 | Mirsky | H04L 45/50 |
| 2019/0104078 | A1* | 4/2019 | Kachrani | H04B 10/032 |
| 2019/0306060 | A1* | 10/2019 | Sharma | H04L 69/325 |

OTHER PUBLICATIONS

Xhonneux, Mathieu, et al., "Flexible failure detection and fast reroute using eBPF and SRv6," 1st Workshop on Segment Routing and Service Function Chaining (SR+SFC 2018), pp. 408-413.
Pignataro, C., et al., "Seamless Bidirectional Forwarding Detection (S-BFD)," Internet Engineering Task Force (IETF), Jul. 2016, pp. 1-24.

* cited by examiner

SYSTEMS AND METHODS FOR PROVIDING BIDIRECTIONAL FORWARDING DETECTION WITH PERFORMANCE ROUTING MEASUREMENTS

PRIORITY CLAIM

The present application claims priority to U.S. Provisional Patent Application No. 62/877,997, filed on Jul. 24, 2019, the contents of which are incorporated herein by reference.

TECHNICAL FIELD

The subject matter of this disclosure relates to bidirectional forwarding detection with performance routing measurements particularly for low bandwidth links.

BACKGROUND

On low bandwidth links or links such as LTE which use a pay-as-you-use model, any link detection and performance routing (PFR) measurements probe can add significant overhead. For example, if a branch is connecting to two datacenter routers with two WAN links each, bidirectional forwarding detection (BFD) running at 1 sec interval with 100B packet size, would consume 2 GB worth of data in a month. This represents a huge overhead for the end users. The BFD requests and responses simply add a large amount of overhead.

FIG. 1 illustrates the current approach 100 between the datacenter 102 and a branch 104. A first BFD echo request 108 is sent from the data center 102 to the branch 104. A BFD echo reply 112 is transmitted in response. The branch 104 also sends a BFD echo request 114 in which the data center 102 provides a BFD echo reply 116. The flow in time of the requests and generated responses is shown as feature 106 for the data center 102 and as feature 110 for the branch 104. FIG. 1 illustrates a high level of overhead for the various BFD echo requests and replies.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
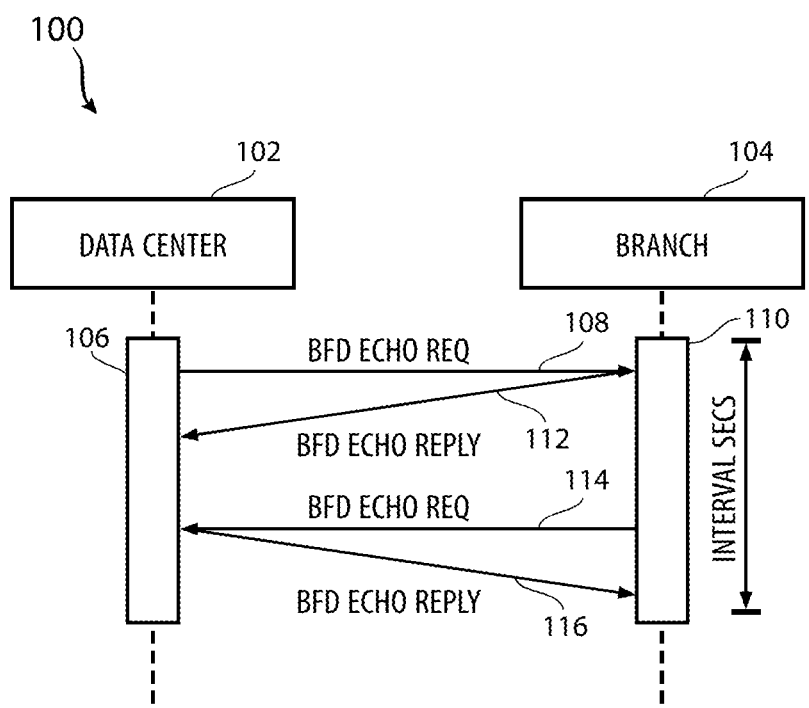
FIG. 1 illustrates a BFD session between the datacenter and a branch.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure provides solutions to the issues with respect to bidirectional forwarding described above. In a normal BFD session. BF) echo-request packets are sent by both routers or devices, and each respective router would reply with BFD echo response packets. This means that four packets would be flowing on the link in each configured interval of time. The proposed solution would make the devices run in a master/slave mode and only one device would send BFD echo request packets. The slave device would depend on the echo request packets to detect liveliness, loss, latency and jitter.

A method includes a first device and a second device each sending BFD echo request packets in an initial stage of establishing communication. The method includes determining that a certain mode is detected, such as a low bandwidth mode. Based on the detection of the certain mode or the communication link being in a certain mode, the method includes the first device or the second device being elected to be a master device or a slave device. Upon establishing that one of the devices is the master device and the other of the devices is the slave device, only the master device will send BFD echo request packets. There are then various approaches in this context for measuring performance, latency, jitter, or to detect liveliness given that only the master device is sending BFD echo request packets.

DESCRIPTION OF EXAMPLE EMBODIMENTS

Disclosed herein are systems, methods, and computer-readable media for innovations which focus on the ability to improve the use of the available bandwidth in a certain modes such as a low bandwidth mode in which a first device communicates with the second device. Other modes can apply as well, such as where a user according to an agreement should receive more bandwidth or has a higher priority than other users. The approach disclosed herein provides an improvement in the use of bidirectional forwarding detection (BFD) echo request packets.

A method aspect of this disclosure includes a first device and a second device each sending BFD echo request packets in an initial stage of establishing communication between the two devices. The method can include determining that a certain mode is detected, such as a low bandwidth mode. Any mode or event may trigger the master/slave interaction between the devices as well. The method can be practiced by one or both of the devices or a separate network controller. Based on the detection of the certain mode or the communication link being in a certain mode, the method includes the first device or the second device electing to be a master device or a slave device. Upon establishing that one of the devices is the master device and the other of the devices is the slave device, only the master device will send BFD echo request packets. The triggering of the election of the devices to be a master or a slave device can also be other parameters or events, such as a trend in data flow or a predicted event such as an expectation that a certain mode is about to be initiated. Any parameter or condition can trigger the election of one of the devices as a master device and the other as a slave device. The triggering event might be a network condition (more bandwidth is needed) or a prediction of a future bandwidth need, a node going down in the network, and so forth. A customer may pay more for a higher bandwidth which could trigger the election and processes disclosed herein. The mode could be implemented, for example, part way through streaming a video, or in response to network congestion or a demand for a large file.

Figure 2A:
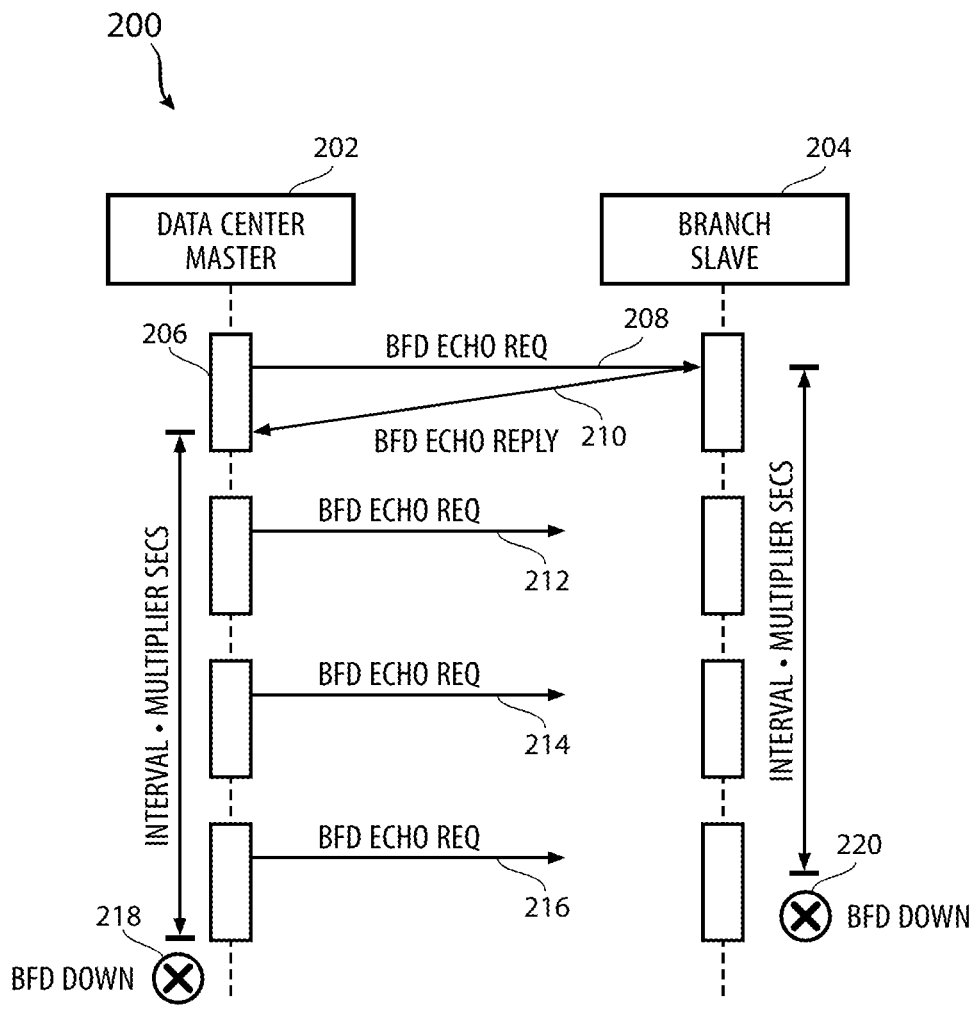
FIG. 2A illustrates a BFD session where uni-direction connectivity is lost.

FIG. 2A illustrates an aspect of this disclosure 200 related to detecting a liveliness failure on a slave device when complete connectivity is lost. The master device 202 and the slave device 204 are established. As time progresses 206, the master device 202 can send a BFD echo request 208 to the slave device 204. The slave device 204 can provide a BFD echo reply 210. The slave device 204 can keep running the time-out time for an interval X. The time-out can be a multiplier of another time-out value as well. This time-out can be reset whenever a BFD echo request packet 212, 214, 216 is received by the device 204. If no packet is received within a time-out period, then the BFD state would be transitioned from up to down 218, 220. In this manner, bandwidth is preserved because there is only one BFD echo reply 210 that is transmitted.

Figure 2B:
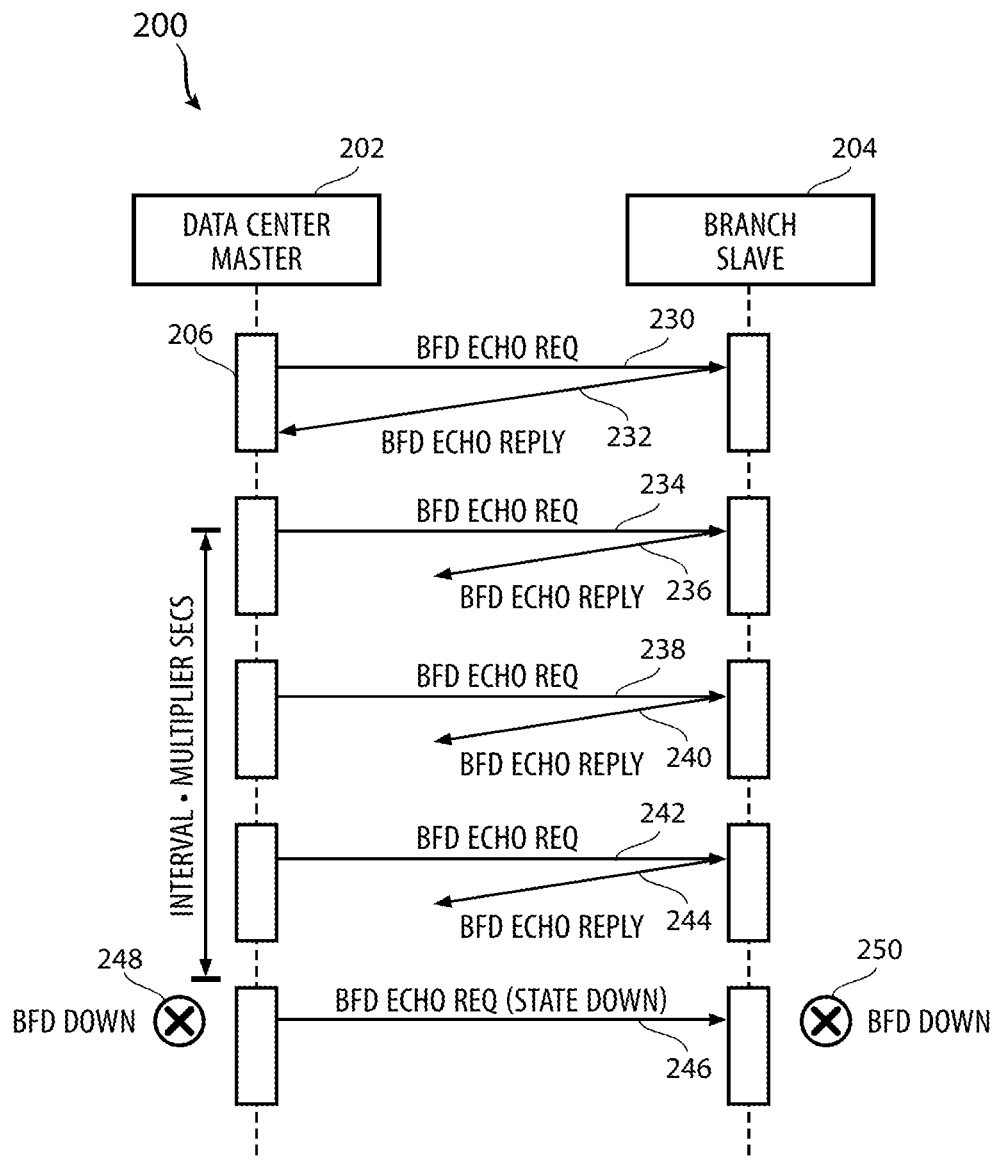
FIG. 2B illustrates a BFD session where complete connectivity is lost.

Another aspect of this disclosure 200 is disclosed in FIG. 2B which relates to detecting liveliness failure on a slave device 204 when unidirectional connectivity is lost. The data center master device 202 and the slave device 204 are established. As noted above, the establishment of the master/slave relationship can be triggered based on any number of factors. The master device 202 sends a BFD echo request 230 to the slave device 204. A first echo reply is provided 232. A second BFD echo request 234 is sent to the slave device 204. In this case, a BFD echo response packet 236 sent by the slave device 204 to the master device 202 won't be received and the time-out will first happen on the master side 206. After that, the BR) echo request packet 246 that the master device 202 sends would have the local state down 248, forcing the slave device 204 to also transition to a down state 250. In this scenario, the BFD echo replies 236, 240, 244 are not received at the master device 202. These replies were respectively sent in response to the BFD echo request 234, 238, 242.

Figure 2C:
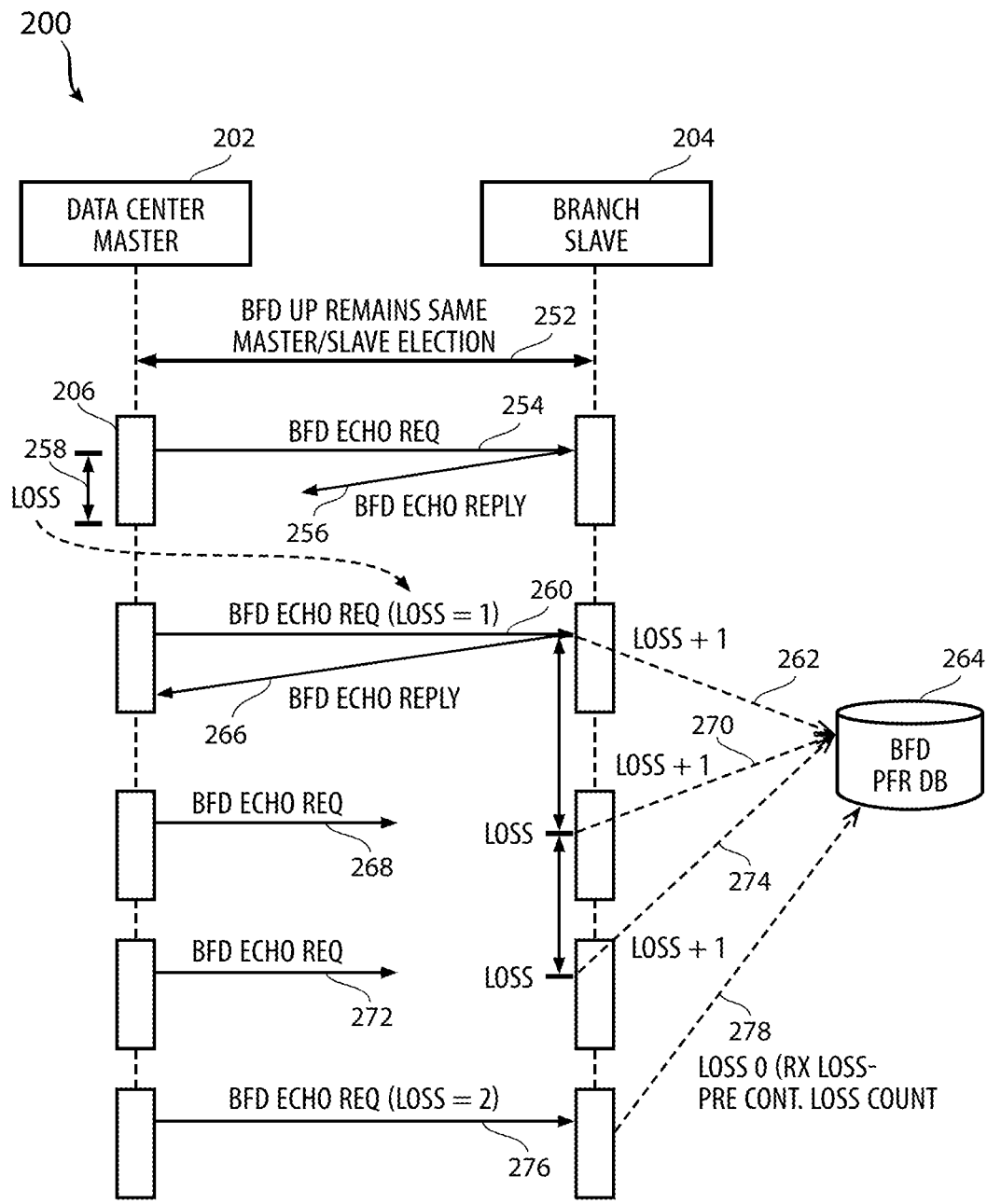
FIG. 2C illustrates a BFD session and an approach to measuring loss.

Another aspect of this disclosure is provided in FIG. 2C and relates to measuring loss. Loss measurements can be based on a combination of two approaches. In the system 200 having a master device 202 and a slave device 204, the master/slave election process to establish the BFD "up" status remains the same 252. In this approach, the system uses a loss value being sent from the master device 202 to the slave device 204. First a BFD echo request 254 is transmitted from the master device 202 to the slave device 204. The BFD echo reply 256 is lost and not received at the master device 202. A loss value or parameter 258 is established and that data is provided as part of the next BFD echo request 260. For example, if this is the first lost echo reply 256, a "Loss=1" value could be added to the BFD echo request 260. This is important or essential if the echo reply packet is dropped. The slave device 204 can retrieve that data and increments a counter 262 or BFD performance (PFR) database 264 with this information. The slave device 204 can then provide a BF echo reply 266.

Assume that the master device 202 then sends a BFD echo request 268 which is not received at the slave device 204. The slave device 204 can again increments the loss database 264 by 1 in feature 270. The master device 202 will transmit another BFD echo request 272, which is not received by the slave device 204. The slave device 204 again increments the loss count in the database 264 via feature 274.

Assume then that the master device 202 transmits the BFD echo request 276 to the slave device 204. The BFD echo request 276 can include an indication of an amount of loss, which in this example equals two because there were two echo replies not received at the master device 202 because the echo request 268 and the echo request 272 were both not received at the slave 204. The data transmitted to the loss database 264 can be represented as feature 278 which indicates a loss of zero as the echo request 276 was received by the slave device 204. In one aspect, the loss at this stage could be the receive loss count (two in this case) minus the previous continuous loss count which is two, resulting in a loss value of zero.

The approach can be based on a local time or on the slave device 204 measuring each interval for which a BFD echo request is not received. As an example, if two echo request packets were dropped (268, 272), the slave device 204 can increment a loss value by two, and then a third echo request packet 276 would also have a loss of two as shown in FIG. 2C. To avoid double counting of this loss, the slave device 204 would subtract the previous loss count seen before the packets 278.

Figure 2D:
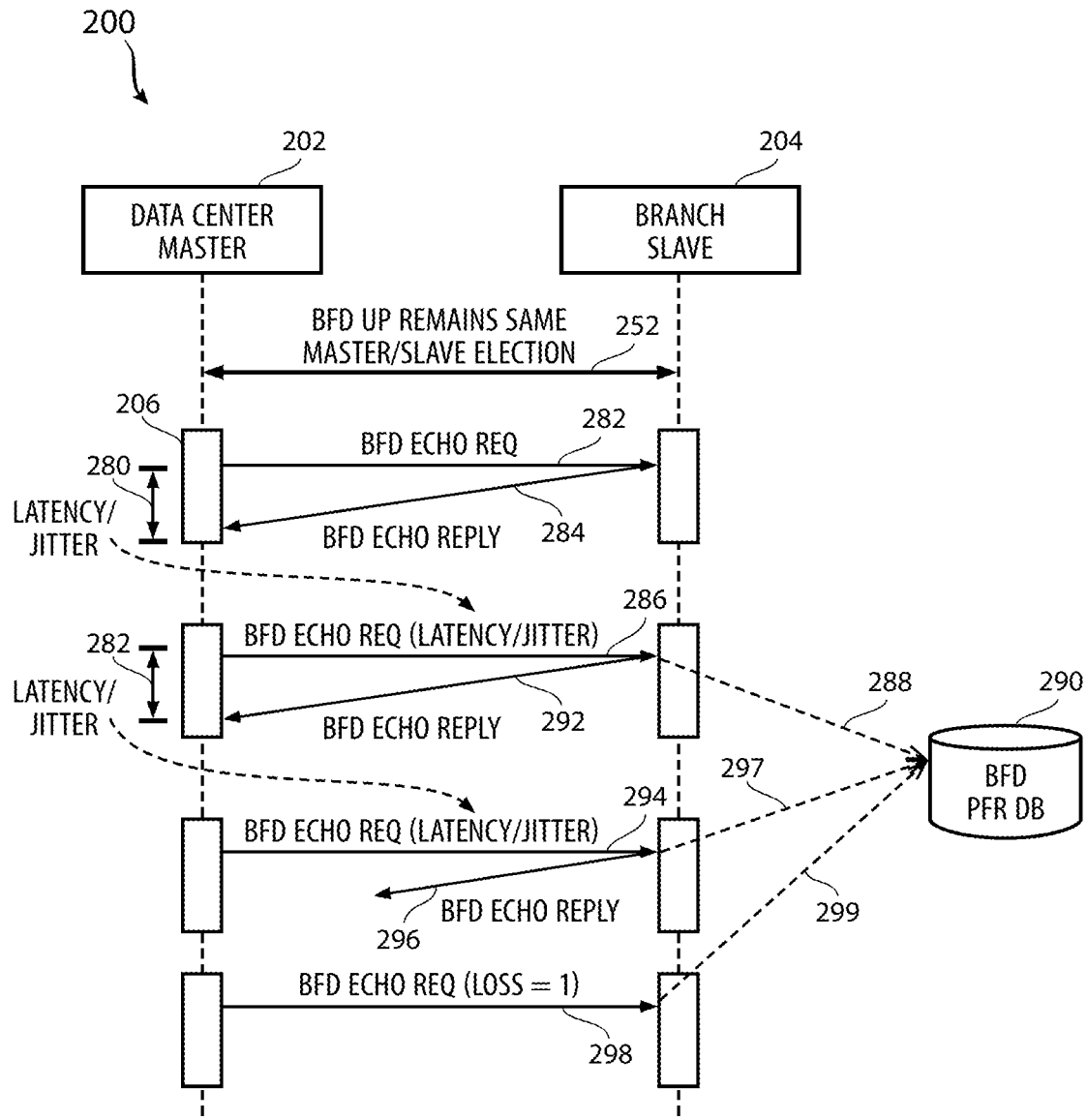
FIG. 2D illustrates a BFD session and measuring latency and jitter.

In another example shown in FIG. 2D, the approach disclosed herein 2 can provide the ability to measure latency and/or jitter between the master device 202 and a slave device 204. In this scenario, the master slave election and set a process 252 remains the same. The master device 202 transmits 206 a BFD echo request 282. The slave device 204 transmits a BFD echo reply 284. The latency or jitter 280 is determined that the master device 202. The process of determining the latency or jitter would be known to those of skill the art. This data can be updated on the slave device 204 based on what is measured or detected by the master device 202. The next echo request packet 286 can include latency and/or jitter data in micro seconds or some other framework and the slave device 204 can use that data to update 288 its PFR database 290. An other words, the process can include inserting latency and/or jitter data into a BR) echo request packet and the slave device 204 can receive that latency and/or jitter data and update a database.

FIG. 2D illustrates a BFD echo reply 292 which can also have an associated latency or jitter 282. That data is provided in the BFD echo request 294 transmitted to the slave device 204. The slave device 204 reports 297 the data to the database 290. In this example, assume that a BR) echo reply 296 is simply not received at the master device 202. In this case, the BFD echo request 298 would include data identifying a loss value of one. This loss value is also reported 299 to the BFD performance database 290.

Figure 3:
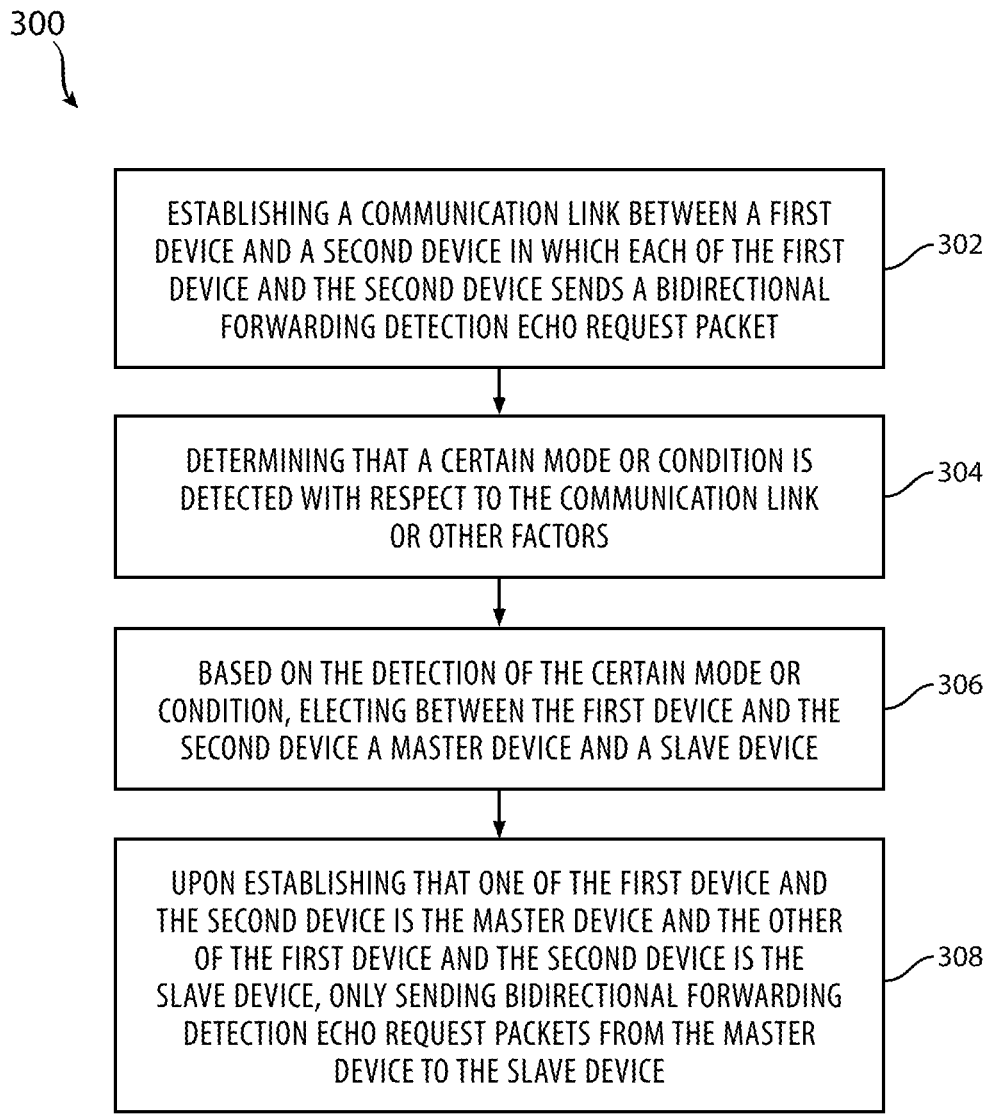
FIG. 3 illustrates an example method.

FIG. 3 illustrates a method aspect of this disclosure from the standpoint of the master node. A method includes establishing a communication link between a first device and a second device in which each of the first device and the second device sends a bidirectional forwarding detection echo request packet (302), determining that a certain mode or condition is detected with respect to the communication link or other factors (304), based on the detection of the certain mode or condition, electing between the first device and the second device a master device and a slave device (306) and, upon establishing that one of the first device and the second device is the master device and the other of the first device and the second device is the slave device, only sending bidirectional forwarding detection echo request packets from the master device to the slave device (308). A communication mode can be considered down by the master node 202 if the master node 202 does not receive replies to more than, for example, two echo requests. The last step (308) can be broadened to include managing a sending of bidirectional forwarding detection echo request packets from the master device 202 to the slave device 204 such that a reply to each respective echo request is not transmitted. As shown, for example, in FIG. 2A, a reply 210 is only transmitted once. This can also mean managing the sending and treatment of bidirectional forwarding detection echo request packets in a particular manner after the set up stage is complete.

The method can also include determining a loss value at the master device based on whether an expected echo reply message is received in response to an echo request message and adding the loss value to a subsequent echo request message. The loss value can be recorded by the slave device 204 in a database. In another aspect, the method can include determining a down state after a predetermined interval of not receiving echo reply messages at the master device and transmitting the down state in an echo request message from the master device to the slave device.

Determining the down state after the predetermined interval of not receiving echo reply messages at the master device further can include not receiving at least two echo reply messages at the master device before determining the down state.

Figure 4:
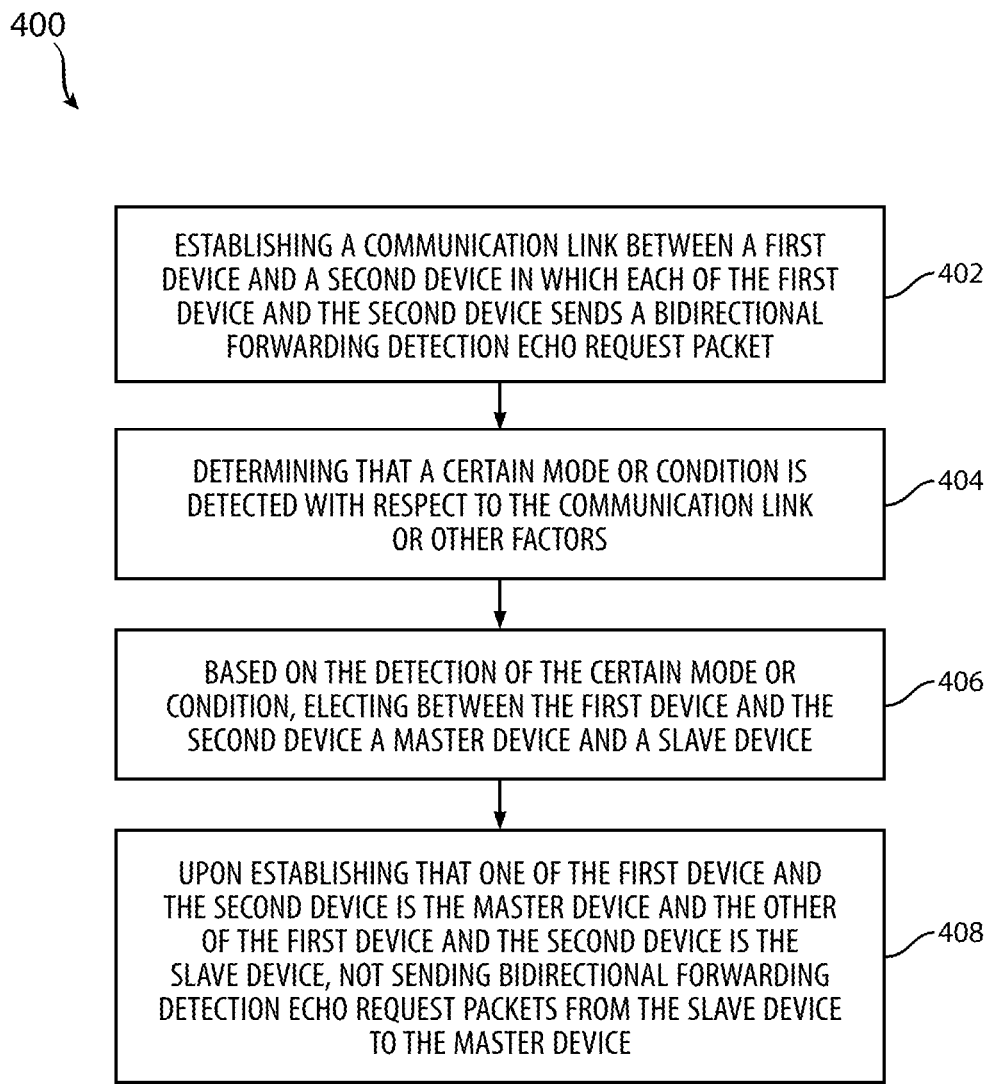
FIG. 4 illustrates another example method.

FIG. 4 illustrates another method aspect from the standpoint of the slave node 204. A method includes establishing a communication link between a first device and a second device in which each of the first device and the second device sends a bidirectional forwarding detection echo request packet (402), determining that a certain mode or condition is detected with respect to the communication link or other factors (404), based on the detection of the certain mode or condition, electing between the first device and the second device a master device and a slave device (406) and, upon establishing that one of the first device and the second device is the master device and the other of the first device and the second device is the slave device, not sending bidirectional forwarding detection echo request packets from the slave device to the master device (408). In one example, if the slave device 204 fails to receive, for example, more than two echo requests from the master device 202, then the slave device 204 can consider the communication channel down 220 between the two devices. Put another way, the system establishes a mode in which only the master device transmits BFD echo request packets and the device that is deemed to be a slave device no longer transmits BFD echo request packets.

In another aspect, the slave device 204 may only transmit BD echo request packets based on a certain criteria such as every third time interval or upon several time intervals of not receiving a BFD echo request packet from the master device 202.

Figure 5:
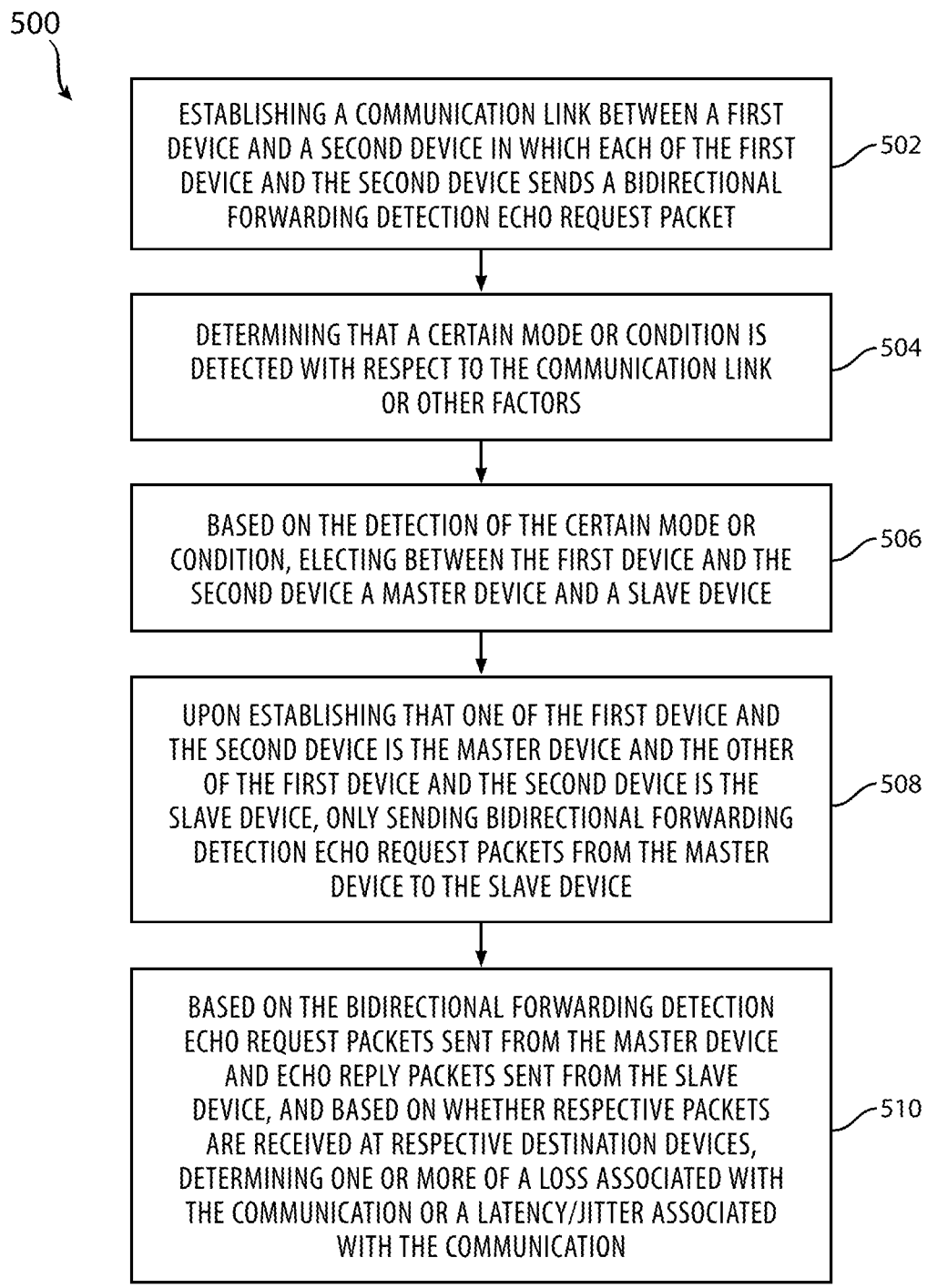
FIG. 5 illustrates yet another example method.

FIG. 5 illustrates an approach which involves utilizing the processes described herein in order to identify or infer one or more parameters associated with the communication between the master device 202 and the slave device 204. For example, utilizing the basic approach can enable a tracking of lost packets, latency or jitter as well as determining when there is a down state. FIGS. 2C and 2D illustrate the ability of the database in connection with the slave device 204 to incrementally track loss and/or latency/jitter utilizing the basic approach described herein.

An example method includes establishing a communication link between a first device and a second device in which each of the first device and the second device sends a bidirectional forwarding detection echo request packet (502), determining that a certain mode or condition is detected with respect to the communication link or other factors (504), based on the detection of the certain mode or condition, electing between the first device and the second device a master device and a slave device (506) upon establishing that one of the first device and the second device is the master device and the other of the first device and the second device is the slave device, only sending bidirectional forwarding detection echo request packets from the master device to the slave device (508) and, based on the bidirectional forwarding detection echo request packets sent from the master device and echo reply packets sent from the slave device, and based on whether respective packets are received at respective destination devices, determining one or more of a loss associated with the communication or a latency/jitter associated with the communication (510).

Typically, the approach described in FIG. 5 can, for the slave device 204 in FIGS. 2C and 2D, include providing data to a database 290 associate with the slave device 204 with respect to loss or latency/jitter. However, the master device 202 could also store data with respect to loss and/or latency/jitter as well.

Figure 6:
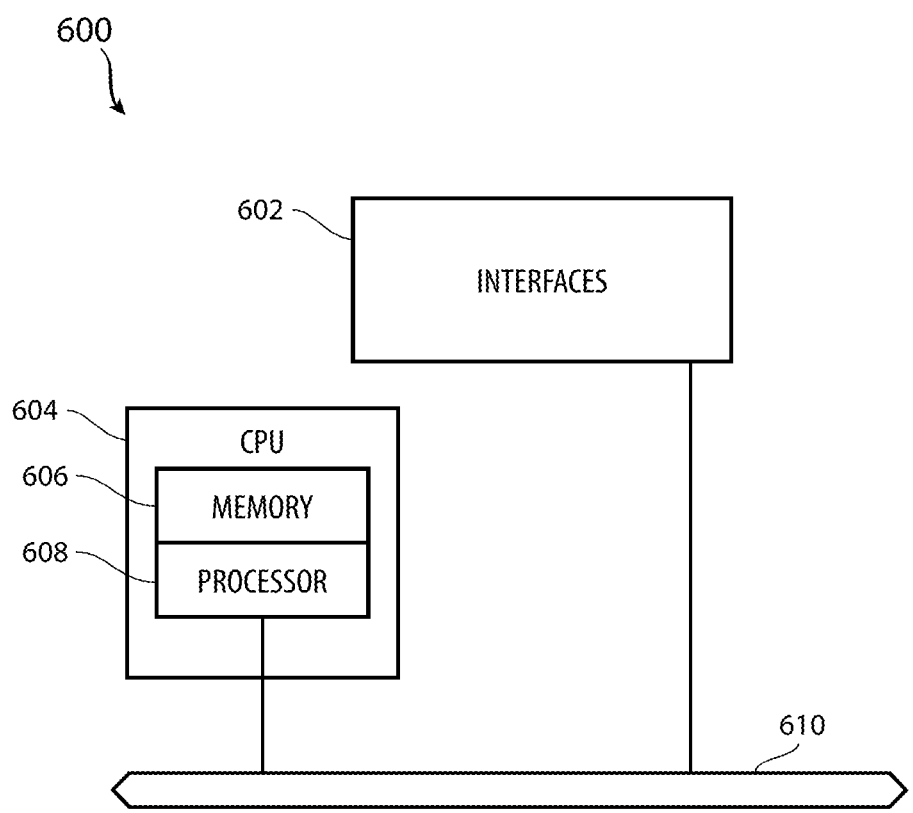
FIG. 6 illustrates an example network device in accordance with various examples.

FIG. 6 illustrates an example network device 600 suitable for implementing aspects of this disclosure. In some examples, the control plane 310 and/or the SVP 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
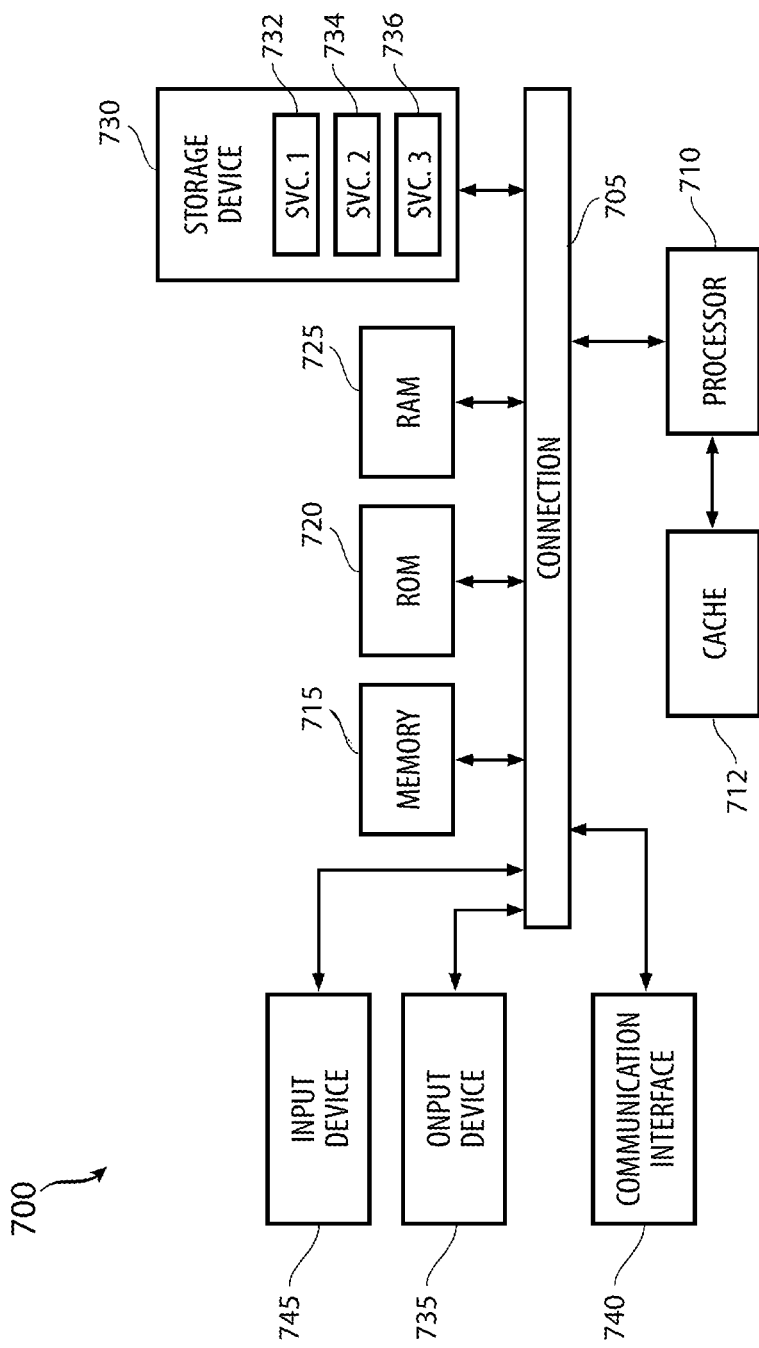
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 70 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 70, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

The present disclosure provides a proposed BFD low bandwidth implementation which can reduce the BFD overhead buy as much as 50% which would provide a large gain for SDWAN (software-defined networking in a wide-area network) customers.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   establishing a communication link between a first device and a second device in which each of the first device and the second device sends a bidirectional forwarding detection (BFD) echo request packet during a start of a bidirectional forwarding session and each of the first device and the second device is configured to send a BFD echo reply packet back in response to receipt of a corresponding BFD echo request packet;
   determining that a certain mode or condition is detected with respect to the communication link or other factors;
   electing between the first device and the second device a master device and a slave device based on a detection of the certain mode or condition; and
   upon establishing that one of the first device and the second device is the master device and the other of the first device and the second device is the slave device:
   sending subsequently transmitted BFD echo request packets from the master device to the slave device during the bidirectional forwarding session, wherein the subsequently transmitted BFD echo request packets include an indication of at least an amount of loss, the indication determined based on one or more previously received BFD echo reply packets; and
   facilitating transmission of BFD echo reply packets to the subsequently transmitted BFD echo request packets from the slave device towards the master device, while refraining from sending any additional BFD echo request packets from the slave device to the master device during a remainder of the bidirectional forwarding session in which the other of the first device and the second device is the slave device in response to establishing the other of the first device and the second device as the slave device.

2. The method of claim 1, further comprising:
   determining a loss value at the master device based on whether an expected BFD echo reply message is received in response to a BFD echo request message; and
   adding the loss value to a subsequent BFD echo request message.

3. The method of claim 2, wherein the loss value is recorded by the slave device in a database.

4. The method of claim 1, further comprising:
   determining a down state after a predetermined interval of not receiving BFD echo reply messages at the master device; and
   transmitting the down state in a BFD echo request message from the master device to the slave device.

5. The method of claim 4, wherein determining the down state after the predetermined interval of not receiving BFD echo reply messages at the master device further comprises not receiving at least two BFD echo reply messages at the master device before determining the down state.

6. A network controller, the network controller comprising:
   a processor; and
   a computer-readable storage device storing instructions which, when executed by the processor, causes the processor to perform operations comprising:
   establishing a communication link between the network controller and a second device in which each of the network controller and the second device sends a bidirectional forwarding detection (BFD) echo request packet during a start of a bidirectional forwarding session and each of the network controller and the second device is configured to send a BFD echo reply packet back in response to receipt of a corresponding BFD echo packet;
   determining that a certain mode is detected with respect to the communication link;
   electing between the network controller and the second device a master device and a slave device, based on a detection of the certain mode; and
   upon establishing that one of the network controller and the second device is the master device and the other of the network controller and the second device is the slave device:
   sending subsequently transmitted BFD echo request packets from the master device to the slave device during the bidirectional forwarding session, wherein the subsequently transmitted BFD echo request packets include an indication of at least an amount of loss, the indication determined based on one or more previously received BFD echo reply packets; and facilitating transmission of BFD echo reply packets to the subsequently transmitted BFD echo request packets from the slave device towards the master device, while refraining from sending any additional BFD echo request packets from the slave device to the master device during a remainder of the bidirectional forwarding session in which the other of the network device and the second device is the slave device in response to establishing one of the network controller and the second device is the slave device.

7. The network controller of claim 6, further comprising:
determining a loss value at the master device based on whether an expected BFD echo reply message is received in response to a BFD echo request message; and adding the loss value to a subsequent BFD echo request message.

8. The network controller of claim 7, wherein the loss value is recorded by the slave device in a database.

9. The network controller of claim 6, further comprising:
determining a down state after a predetermined interval of not receiving BFD echo reply messages at the master device; and transmitting the down state in a BFD echo request message from the master device to the slave device.

10. The network controller of claim 9, wherein determining the down state after the predetermined interval of not receiving BFD echo reply messages at the master device further comprises not receiving at least two BFD echo reply messages at the master device before determining the down state.

11. A method comprising:
establishing a communication link between a first device and a second device in which each of the first device and the second device sends a bidirectional forwarding detection (BFD) echo request packet during a start of a bidirectional forwarding session and each of the first device and the second device is configured to send a BFD echo reply packet back in response to receipt of a corresponding BFD echo request packet;

determining that a certain mode or condition is detected with respect to the communication link or other factors;

electing between the first device and the second device a master device and a slave device, based on a detection of the certain mode or condition; and upon establishing that one of the first device and the second device is the master device and the other of the first device and the second device is the slave device:

identifying, at the master device, a condition associated with a BFD echo reply message;

sending subsequently transmitted BFD echo request packets from the master device to the slave device during the bidirectional forwarding session, wherein the subsequently transmitted BFD echo request packets include an indication of at least an amount of loss, an amount of latency, or an amount of jitter, the indication determined based on one or more previously received BFD echo reply packets; and facilitating transmission of BFD echo reply packets to the subsequently transmitted BFD echo request packets from the slave device towards the master device, while refraining from sending any additional BFD echo request packets from the slave device to the master device during a remainder of the bidirectional forwarding session in which the other of the first device and the second device is the slave device in response to establishing the other of the first device and the second device as the slave device.

12. The method of claim 11, further comprising:
adding, after master device, the condition to a subsequent BFD echo request packet transmitted to the slave device.

13. The method of claim 11, wherein the condition relates to one or more of a loss, a latency value, and a jitter value.

14. The method of claim 11, wherein the condition relates to a loss value and wherein the method further comprises determining the loss value at the master device based on whether an expected BFD echo reply message is received in response to a BFD echo request message.

15. The method of claim 14, wherein the loss value is recorded by the slave device in a database.

16. The method of claim 11, wherein the condition relates to a latency value and wherein the method further comprises determining the latency value at the master device based on a received BFD echo reply message in response to a BFD echo request message.

17. The method of claim 16, wherein the latency value is recorded by the slave device in a database.

18. The method of claim 11, wherein the condition relates to a jitter value and wherein the method further comprises determining the jitter value at the master device based on a received BFD echo reply message in response to a BFD echo request message.

19. The method of claim 18, wherein the jitter value is recorded by the slave device in a database.

20. The method of claim 1, wherein the subsequently transmitted BFD echo request packets include an indication of at least an amount of jitter or an amount of latency, the indication determined based on the one or more previously received BFD echo reply packets.

* * * * *